US008566109B2

(12) United States Patent
Mohammed et al.

(10) Patent No.: US 8,566,109 B2
(45) Date of Patent: Oct. 22, 2013

(54) COMMON INTEREST COMMUNITY SERVICE VIA PRESENCE MESSAGING

(75) Inventors: Aziz Mohammed, Plano, TX (US); Sig H. Badt, Jr., Richardson, TX (US)

(73) Assignee: Alcatel Lucent, Paris (FR)

( * ) Notice: Subject to any disclaimer, the term of this patent is extended or adjusted under 35 U.S.C. 154(b) by 1486 days.

(21) Appl. No.: 11/289,138

(22) Filed: Nov. 29, 2005

(65) Prior Publication Data

US 2007/0124469 A1    May 31, 2007

(51) Int. Cl.
*G06Q 10/00* (2012.01)
*G06Q 99/00* (2006.01)
*G06F 15/173* (2006.01)

(52) U.S. Cl.
USPC .............................. 705/1.1; 705/319; 709/225

(58) Field of Classification Search
USPC ................................... 705/1.1, 319; 709/225
See application file for complete search history.

(56) References Cited

U.S. PATENT DOCUMENTS

| 6,029,195 | A  | * | 2/2000  | Herz .............................. 725/116 |
| 6,834,195 | B2 | * | 12/2004 | Brandenberg et al. ...... 455/456.3 |
| 7,206,934 | B2 | * | 4/2007  | Pabla et al. .................... 713/168 |
| 7,207,286 | B2 | * | 4/2007  | Tafoya ........................... 114/290 |
| 7,464,168 | B1 | * | 12/2008 | Abdelaziz et al. ............. 709/229 |
| 7,505,779 | B1 | * | 3/2009  | David ............................ 455/518 |
| 7,680,770 | B1 | * | 3/2010  | Buyukkokten et al. ........ 707/758 |
| 7,752,253 | B2 | * | 7/2010  | Manion et al. ................. 709/200 |
| 7,752,273 | B2 | * | 7/2010  | Ito et al. ........................ 709/206 |
| 2003/0217142 | A1 | * | 11/2003 | Bobde et al. .................. 709/224 |
| 2004/0137882 | A1 | * | 7/2004  | Forsyth ...................... 455/414.1 |
| 2005/0068167 | A1 | * | 3/2005  | Boyer et al. .................. 340/531 |

FOREIGN PATENT DOCUMENTS

| WO | 0145342 A2 | 6/2001 |
| WO | 2005096592 A1 | 10/2005 |

OTHER PUBLICATIONS

Kanter, Theo G. Attaching Context-Aware Services of Moving Locations. IEEE Internet Computing7. 2 (Mar. 2003): 43-51.*
Diss.Zhao, Liping. Instant messaging-based networked service provisioning and access framework. Carleton University (Canada), ProQuest, UMI Dissertations Publishing, 2004. MQ93994.*
Schulzrinne,et al.; RPIDS—Rich Presence Information Data Format for Presence Based on the Session Initiation Protocol (SIP); IETF Internet Draft; Feb. 18, 2003; pp. 1-20.
Sugano, et al.; Presence Information Data Format; IETF Network Working Group; RFC 3863; Aug. 2004; pp. 1-28.
Schulzrinne, et al.; RPID: Rich Presence Extensions to the Presence Information Data Format (PIDF); draft-ietf-simple-rpid-06; IETF Simple; Internet Draft; Jun. 2, 2005; pp. 1-37.
Schulzrinne, H.; Timed Presence Extensions to the Presence Information Data Format (PIDF) to Indicate Status Information for Past and Future Time Intervals; draft-ietf-simple-future-04; IETF Simple; Internet Draft; Jun. 26, 2005; pp. 1-14.
Schulzrinne, H.; CIPID: Contact Information in Presence Information Data Format; draft-ietf-simple-cipid-04; IETF Simple; Internet Draft; May 30, 2005; pp. 1-10.

* cited by examiner

*Primary Examiner* — Jonathan Ouellette
*Assistant Examiner* — Amanda Kirlin
(74) *Attorney, Agent, or Firm* — RGIP LLC

(57) ABSTRACT

A method of implementing common interest community services in a presence system comprising creating a common interest community in which an interest state of a presence message is aggregated into a group in the presence system, publishing a member presence information to the common interest community to be selectively made available to a subscribing member of the common interest community and subscribing to the common interest community for receiving the member presence information, wherein a publishing member may selectively grant an access level.

18 Claims, 4 Drawing Sheets

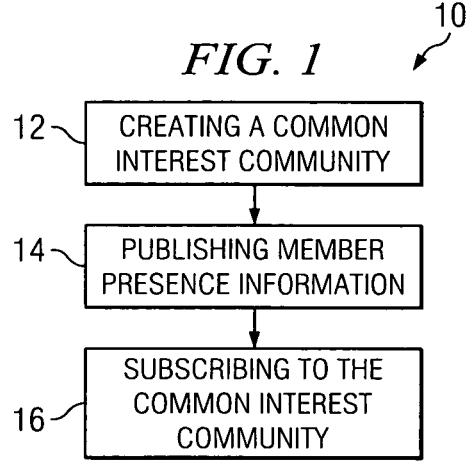
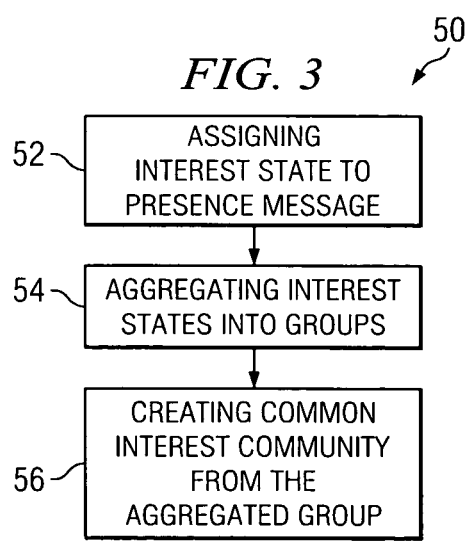

COMMON INTEREST COMMUNITY SERVICE VIA PRESENCE MESSAGING

BACKGROUND OF THE INVENTION

Presence is generally defined as knowing that a person is available via, for example, a certain device over a particular medium as soon as the user connects to the network. For instance, via presence information, it may be ascertained that the person is available online, and on a connected device with a certain device profile. Currently presence is only used to communicate the state information of a person or an entity. A user which indicates its presence on the network is termed a presentity. Presence is used to notify a group of watchers, for example in a contact list, about the state of person, including availability. When the user changes its presence state, each contact on the contact list is informed about the new presence state of the user.

The present invention is generally related to presence messaging to provide common interest community services, and more specifically to enable common interest community service via presence messaging. The invention utilizes presence to enable communities to be created based on common interest. In this case, presence infrastructure is used to carry the messaging somewhat similar to Instant Messaging (IM) or Short Message Service (SMS) only to a specific community, and is not delivered to all other entities which are watchers of the same presentity but only those which are matched to an interest state of the presence message.

Therefore, what is needed is a method of using presence messaging to enable creation of a common interest community. More specifically, assigning an interest state to a presence message and directing the presence message to at least one common interest community member.

The interest state of a presence message of the present invention enables directing the presence message to a common interest community member. The common interest community member in the present invention is at least one of a set community members from an aggregated group having similar interest states. The common interest community members are pre-determined according to criteria set in the interest state.

Current presence systems lacks an integrated approach for collecting and distributing common interest information, lack privacy and filtering mechanisms necessary for common interest information exchange and lack integration with communication systems like telephony, IM and email.

The present invention allows users with a common interest to use existing presence infrastructure to create a common interest community and facilitate their likely future communication amongst themselves. Interest based communication can be built utilizing databases which include people's interest, skills and other similar information.

Examples of such likely communications scenarios include opportunity communication among attendees of public conferences or conferences within large companies, ad-hoc communication among people who pursue common hobbies such as stamp collectors who want to exchange items of interest to community members, communication among vacation home owners who want to exchange vacation homes, holiday trip planners, hotels and flight service providers and internal recruiters to initiate communication with employees based on skill based information.

Communication between users that have common interests and are likely to communicate in the future can be facilitated by forming the common interest community. The present invention utilizes an extension of the existing Presence Information Document Format (PIDF) to account for information elements of value to the community. The basic PIDF defines the textual note, the indication of availability and a Universal Resource Identifier (URI) for communication. The Rich Presence Information Document (RPID) gives additional optional elements about the presentity and its contacts. The RPID includes information about what the person is doing, the type of place the user is in, the time zone along with the type of services that are available, and the like.

Presence communities can be created in the several ways. A third party entity may use the presence infrastructure to advertise the formation of the common interest community. For example, conference organizers can target advertisement to potential conference attendees who may need to exchange information of common interest such as topics of interest, level of expertise and daily schedule. A community member can publish his member presence information using the RPID to the presence server. Subscription to the common interest community may be passively authorized through the trusted third party for minimal default member presence information. Users will retain the privacy and filtering features of the presence infrastructure to adjust the desired presence exposure to each community member.

Peer-to-peer communication can be utilized to create a common interest community. In this case, users who form the presence community (e.g. stamp collectors who would like to exchange information and stamps) may invite potential members directly. Mechanisms such as email or presence enhanced IM can be used for this purpose. The users who choose to join the community will publish their common interest and other relevant info to the present system using the extended PIDF. In this case, access level authorization and filtering are handled by the owners of the member presence information themselves.

If the community member decides that showing his member presence information would be valuable to him, he has the ability to publish and update his RPID. If the user wishes, he can query the presence server to see what member presence information is available for distribution and the policy or policies associated with it. The user can indicate the member presence information to be made available to the common interest community. If the user decides that receiving member presence information of the common interest community member is valuable to him, he can subscribe to the common interest community to get the member presence information.

As an example, consider both a first and a second user as members of the same common interest community. The first user can send a subscription request to the presence service to view the second user's member presence information. The third party entity acts on behalf of the second user and passively authorizes viewing of minimal default member presence information. Either user can authorize the other user to see more detailed member presence information about themselves. Alternatively, if there is no third party entity, the second user can handle the authorization and filtering of his own member presence information. The presence server will provide the second user options to deny the first user's request, fully accept the request, partially accept the request along with mechanisms to select what member presence information to be made available to first user, or other related actions. If the second user grants permission directly or indirectly, his common interest community member presence information is sent as a notification to the first user who utilizes the second user's filtering and privacy policy.

The present invention allows current presence infrastructure to be leveraged for the creation of common interest presence communities. Users can have control over who is subscribed to view member presence information, and integration can be achieved with basic presence information and communication means like telephony, IM and email.

In one embodiment of the invention a method of implementing common interest community services in a presence system comprises creating a common interest community in which an interest state of a presence message is aggregated into a group in the presence system, publishing a member presence information to the common interest community to be selectively made available to a subscribing member of the common interest community and subscribing to the common interest community for receiving the member presence information, wherein a publishing member may selectively grant an access level. The method may also include assigning the interest state of the presence message to the member presence information, scanning the interest state of the member presence information, matching the interest state to the common interest community, filtering the member presence information, authorizing access to the subscribing member of the member presence information, viewing the member presence information, collecting the member presence information and distributing the member presence information.

In another embodiment of the invention a computer readable medium comprises instructions for assigning an interest state to a presence message, aggregating a group according to the interest state of the presence message and creating a common interest community of the aggregated group. The instructions may also include publishing a member presence information to the common interest community to be selectively made available to a subscribing member of the common interest community, subscribing to the common interest community to receive the member presence information, granting an access level to the subscribing member, authorizing an access level to the subscribing member of the member presence information, scanning the interest state of the member presence information, matching the interest state to the common interest community, filtering the presence message, viewing the presence message, collecting the presence message and distributing the presence message.

In a further embodiment of the invention a system for common interest community service via presence messaging, comprises a memory in which is received a presence message having an interest state and a first processor communicably coupled to the memory, the first processor adapted to assign the interest state to the presence message and send the presence message to the memory. The system may also include a second processor communicably coupled to the memory, the second processor adapted to scan the interest state of the presence message, aggregate a group according to the interest state of the presence message, create a common interest community of the aggregated group, and publish a member presence information to the common interest community. The system may further include a third processor communicably coupled to the memory, the third processor adapted to subscribe to the common interest community for receiving the member presence information, wherein a publishing member may selectively grant an access level and receive the presence message.

BRIEF DESCRIPTION OF THE DRAWINGS

FIG. 1 depicts a first flow chart of common interest community service via presence messaging in accordance with a preferred embodiment of the present invention;

FIG. 2 depicts a second flow chart of common interest community service via presence messaging in accordance with a preferred embodiment of the present invention;

FIG. 3 depicts a first software flow chart of common interest community service via presence messaging in accordance with a preferred embodiment of the present invention;

DETAILED DESCRIPTION OF THE INVENTION

Figure 4:
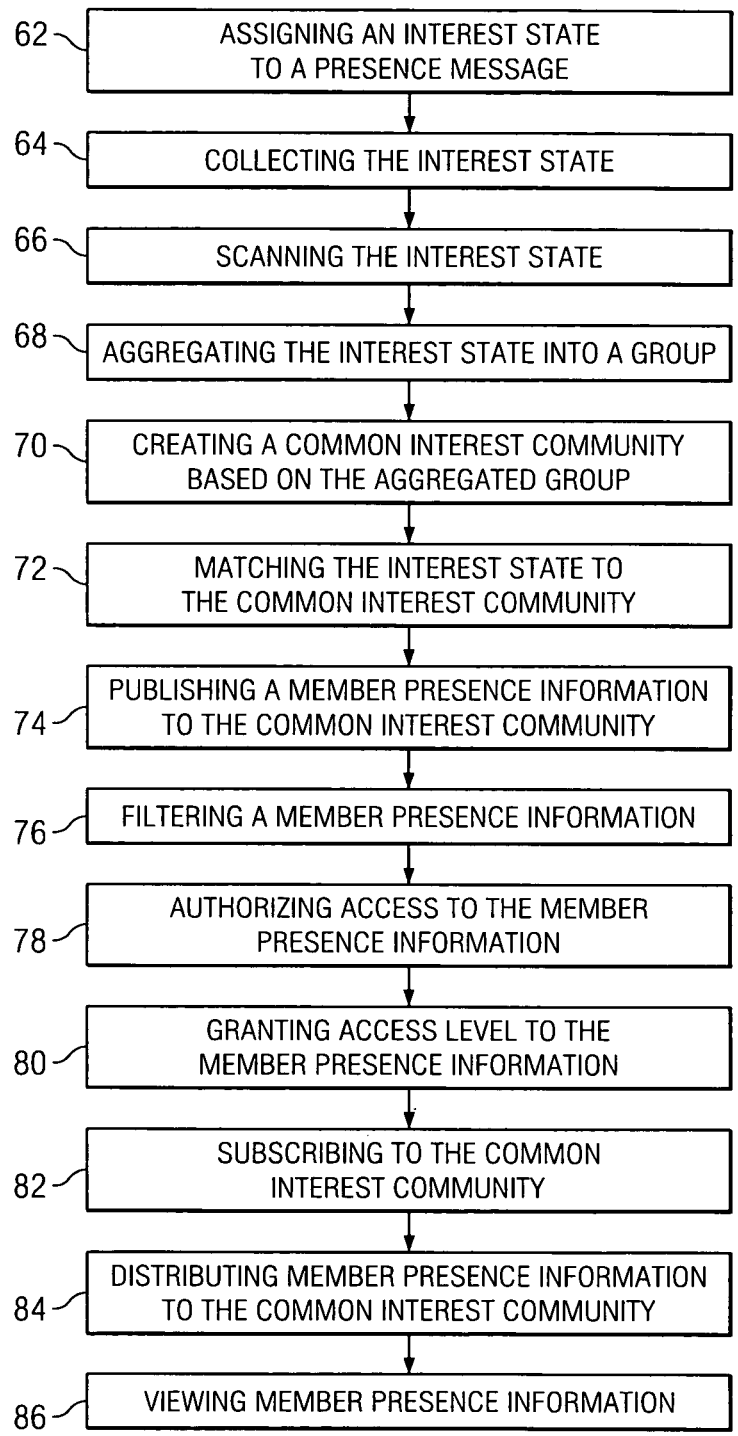
FIG. 4 depicts a second software flow chart of common interest community service via presence messaging in accordance with a preferred embodiment of the present invention.

Referring now to FIG. 1, a first flow chart of the method of common interest community service via presence messaging 10 is shown. Presence is the technology by which a user, called a presentity, makes his or her state known to another individual, called a watcher. Currently, the most common use for presence is to assist in the establishment of communication sessions utilizing a presence message. A network in which presence is established is called a presence infrastructure or a presence system and typically resides on a presence server. In the present invention a common interest community is created 12 based upon a group of aggregated presence messages having an interest state which is similar. The interest state can contain interest based information and is linked to the presence message. A member presence information is published 14 to the common interest community by a publishing member. A subscribing member can subscribe 16 to the common interest community and can access the member presence information that was published to the common interest community. The steps performed in this figure are performed by software, hardware, firmware, and/or the combination of software, hardware, and/or firmware. The transfer of information between the assignment of the interest state of the presence message and its publishing to the common interest community occurs via at least one of a wireless protocol, a wired protocol and a combination of the wireless protocol and the wired protocol.

Referring now to FIG. 2, a more detailed second flow chart of the method of common interest community service via presence messaging 20 is shown. In the present invention the interest state is assigned 22 to the presence message. The presence message interest states are collected 24 by the presence infrastructure. The presence message interest state is scanned 26 by the presence infrastructure. The common interest community is created 28 and contains the presence messages having similar interest states. The interest state is matched 30 to the common interest community associated with the interest state. The member presence information associated with the interest state is published 32 to the common interest community associated with the interest state. Member presence information is filtered 34 according to the publishing member. The publishing member authorizes 36 an access level to member presence information. The user may subscribe 38 to the common interest community. The common interest community distributes 40 member presence information and allows viewing 42 of filtered and authorized member presence information. The steps performed in this figure are performed by software, hardware, firmware, and/or the combination of software, hardware, and/or firmware. The transfer of information of the interest state of the presence message occurs via at least one of a wireless protocol, a wired protocol and a combination of the wireless protocol and the wired protocol.

Referring now to FIG. 3, the first software flow block of the method of common interest community service via presence messaging 50 is shown. In the present invention the interest state is assigned 52 to the presence message by the presentity. The presence message is aggregated 54 into groups according to the interest state. Common interest communities are created 56 based upon the aggregated groups having similar interest states. For example, the presence infrastructure may be accessed by the cellular phone or the computer with external wireless capability (such as the wireless card) or internal wireless capability (such as 802.11 or any of the other 802 variants), or by the Internet Protocol enabled phone. Other devices may also communicate with the presence infrastructure. The steps performed in this figure are performed by software, hardware, firmware, and/or the combination of software, hardware, and/or firmware. The transfer of information of the interest state of the presence message occurs via at least one of a wireless protocol, a wired protocol and the combination of a wireless protocol and a wired protocol.

Referring now to FIG. 4, a more detailed second software flow block of the method of common interest community service via presence messaging 60 is shown. In the present invention the interest state of the presence message is assigned 62 to the presence message. The interest state of the presence message is collected 64 by the presence infrastructure. The interest state of the presence message is scanned 66 and presence messages having similar interest states are aggregated 68 into groups of common interest. Common interest communities are created 70 based upon the aggregated groups having common interest. Presence messages are matched 72 by interest state to determine the common interest community for the presence message. Member presence information is published 74 for the matched presence message. The member presence information of the published presence message is filtered 76 and access is authorized 78 by the publishing member. The publishing member additionally grants 80 the access level to the member presence information. The subscribing member may subscribe 82 to the common interest community. The common interest community distributes 84 member presence information and allows viewing 86 of filtered and authorized member presence information. The steps performed in this figure are performed by software, hardware, firmware, and/or the combination of software, hardware, and/or firmware. The transfer of information of the interest state of the presence message occurs via at least one of a wireless protocol, a wired protocol and the combination of a wireless protocol and a wired protocol.

The present invention includes unique computer readable medium that comprises instructions (or software) that is preferably stored on the presence server. In other embodiments, the software of the present invention can be stored on the presentity, the watcher or the combination of at least two of: the presence server, the presentity, and the watcher. The computer readable medium of the present invention comprises instructions for performing the functionality described in relation to FIGS. 1-4 and for assigning the interest state to the presence message, publishing the member presence information and subscribing to the common interest community.

Figure 5:
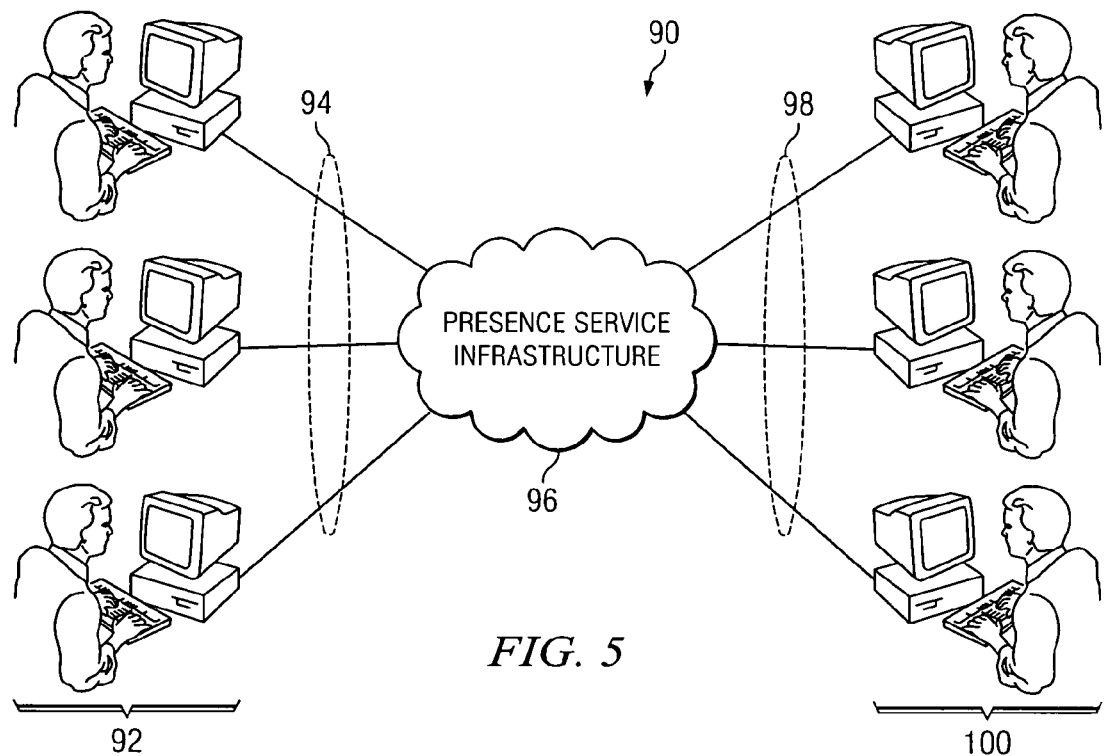
FIG. 5 depicts a system of common interest community service via presence messaging in accordance with a preferred embodiment of the present invention.

Referring now to FIG. 5, a system of common interest community service via presence messaging 90 is shown. In the present invention, a first processor 92 publishing member (presentity) transfers the presence message having the interest state to a second processor 96 common interest community (presence infrastructure). A third processor 100 (subscribing member) receives the presence message having the interest state from the presence infrastructure. The first processor (publishing member) and the third processor (subscribing member) are communicably coupled to the second processor common interest community (presence infrastructure) via a wireless or wired connection 94, 98. For example, the presence infrastructure may be accessed by a cellular phone or a computer with external wireless capability (such as a wireless card) or internal wireless capability (such as 802.11 or any of the other 802 variants), or by an Internet Protocol enabled phone. Other devices may also communicate with the presence infrastructure. These modules are software, hardware, firmware, and/or the combination of software, hardware, and/or firmware. The communications coupling occurs via at least one of a wireless protocol, a wired protocol and the combination of a wireless protocol and a wired protocol. In other embodiments, the functionality described above can be performed by one of the processors or by another number of the processors (shown and not shown in FIG. 5).

Figure 6:
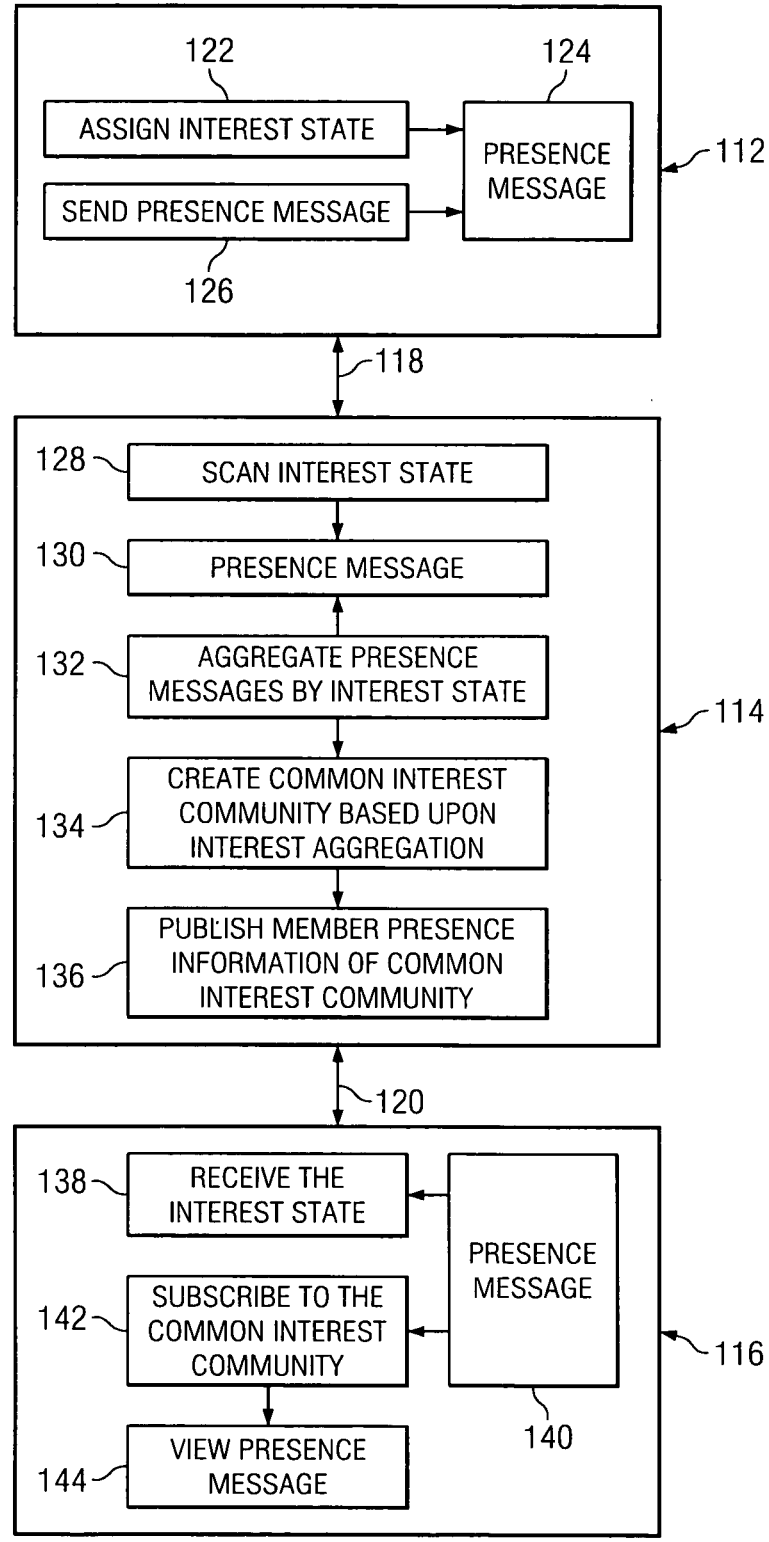
FIG. 6 depicts a detailed system of common interest community service via presence messaging in accordance with a preferred embodiment of the present invention.

Referring now to FIG. 6, a system of common interest community service via presence messaging 110 is shown in greater detail. In the present invention, a first processor 112 publishing member (presentity) is communicably coupled 118 to a second processor 114 which is the presence server providing presence infrastructure for the common interest community. A third processor 116 subscribing member (watcher) is communicably coupled 120 to the second processor 114. The interest state is assigned 122 to the presence message 124 by the first processor 112 publishing member (presentity). The presence message is sent 126 to the presence infrastructure by the first processor publishing member (presentity). The interest state of the presence message is scanned 128 by the second processor 114 common interest community (presence server). The interest state of the presence message is stored in a memory 130 and is aggregated 132 by interest state into the group. The common interest community is created 134 based upon the aggregated group according to specific interest state. The presence message is published 136 to the second processor which acts as the presence server (common interest community).

The interest state of the presence message is received 138 by the third processor 116 (subscribing member). The subscribing member can subscribe 142 to the common interest community. The publishing member can authorize the access level to allow the subscribing member to view 144 the presence message 140. Other devices may also communicate with the presence infrastructure. These modules are software, hardware, firmware, and/or the combination of software, hardware, and/or firmware. The communications coupling occurs via at least one of a wireless protocol, a wired protocol and the combination of a wireless protocol and a wired protocol. In other embodiments, the functionality described above can be performed by one of the processors or by another number of the processors (shown and not shown in FIG. 6).

Although the exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the first, second or third processors. Also, these capabilities may be performed in the current manner or in a distributed manner and on, or via, any device able to direct presence messages to common interest community members. Further, although depicted in a particular manner, various flow chart blocks or components may be repositioned without departing from the scope of the current invention. For example, the first, second and third processors could be united into one processor. Still further, although depicted in a particular manner, a greater or lesser number of users, watchers and presence infrastructures could be utilized.

Still further, a lesser or greater number of interest states may be utilized with the present invention and presence messages of the present invention may include complementary information in order to accomplish the present invention, to provide additional features to the present invention, and/or to make the present invention more efficient.

What is claimed is:

1. A method of implementing common interest community services in a presence system comprising:
    assigning interest states to a plurality of presence messages based on content of the presence messages and storing the presence messages in memory;
    automatically creating a common interest community in which the interest states assigned to the plurality of presence messages that are stored in a memory are aggregated into a group in the presence system by a presence server, the interest states are aggregated into the group by matching the interest states of the plurality of presence messages to a similar common interest associated with the group;
    publishing member presence information to the common interest community to be selectively made available to a subscribing member of the common interest community, wherein the publishing information is made available by the presence server; and
    subscribing to the common interest community by a subscribing member for receiving the member presence information from the presence server, wherein a publishing member may selectively grant an access level.

2. The method of claim 1 comprising assigning the interest states of the presence messages to the member presence information by the presence server.

3. The method of claim 1 comprising scanning by the presence server the interest states of the member presence information.

4. The method of claim 1 comprising matching the interest states by the presence server to the common interest community.

5. The method of claim 1 comprising filtering the member presence information by the presence server.

6. The method of claim 1 comprising authorizing access to the subscribing member of the member presence information.

7. The method of claim 1 comprising viewing the member presence information by the subscribing member.

8. The method of claim 1 comprising collecting the member presence information by the presence server.

9. The method of claim 1 comprising distributing the member presence information by the presence server.

10. A non-transitory computer readable storage medium having computer-executable instructions for execution by a processing system, the computer-executable instructions for implementing common interest community services in a presence system, the computer-readable medium comprising instructions that when executed cause a processor to perform:
    assigning interest states to a plurality of presence messages based on content of the presence messages and storing the plurality of presence messages in memory;
    automatically creating a common interest community in which the interest states assigned to the presence messages that are stored in the memory are aggregated into a group according to the interest states of the presence messages by a presence server, wherein the interest states are aggregated into the group by matching the interest states of the plurality of presence messages to a similar common interest associated with the group;
    publishing by the presence server a member presence information to the common interest community to be selectively made available to a subscribing member of the common interest community;
    subscribing to the common interest community to receive the member presence information from the presence server; and
    granting an access level to the subscribing member.

11. The computer readable medium of claim 10 comprising instructions for authorizing an access level to the subscribing member of the member presence information.

12. The computer readable medium of claim 10 comprising instructions for scanning the interest states of the member presence information by the presence server.

13. The computer readable medium of claim 10 comprising instructions for matching the interest states to the common interest community by the presence server.

14. The computer readable medium of claim 10 comprising instructions for filtering the presence messages by the presence server.

15. The computer readable medium of claim 10 comprising instructions for viewing the presence messages by the subscribing member.

16. The computer readable medium of claim 10 comprising instructions for collecting the presence messages by the presence server.

17. The computer readable medium of claim 10 comprising instructions for distributing the presence messages by the presence server.

18. A system for common interest community service via presence messaging, comprising:
    a memory including a plurality of presence messages and a corresponding plurality of interest states assigned to the presences messages; and
    a first processor communicably coupled to the memory, the first processor adapted to:
    assign the interest states stored in the memory to the presence messages based on content of the presence messages;
    send the presence messages assigned with the corresponding interest states to the memory and store the presence messages in the memory;
    automatically create a common interest community in which the interest states assigned to the presence messages that are stored in the memory are aggregated into a group according to the interest states of the presence messages, where the interest states are aggregated into the group by having the interest states of the presence messages match to a similar common interest associated with the group;
    a presence server comprising a second processor communicably coupled to the memory, the second processor adapted to:
    scan the interest states of the presence messages; and
    publish a member presence information to the common interest community;
    a third processor communicably coupled to the memory, the third processor adapted to:
    subscribe to the common interest community to receive the member presence information from the presence server, wherein a publishing member may selectively grant an access level; and
    receive the presence messages from the presence server.

* * * * *